United States Patent Office 3,594,420
Patented July 20, 1971

3,594,420
PROCESS FOR PRODUCING AMINES
Georges Gobron and Remy Proust, Melle, France, assignors to Melle-Bezons, Melle, Deux-Sevres, France
No Drawing. Filed Oct. 14, 1968, Ser. No. 767,466
Claims priority, application France, Oct. 25, 1967, 125,763
Int. Cl. C07c 85/00
U.S. Cl. 260—583R
9 Claims

ABSTRACT OF THE DISCLOSURE

The preparation of monoethylamine, which may be accompanied by the formation of small amounts of diethylamine by hydrogenation of aldehyde ammonia in solution in monoethylamine, diethylamine or mixtures thereof.

---

This invention relates to the preparation of amines and more particularly to the preparation of monoethylamine.

The conventional process for the preparation of such amines is by hydrogenation of aldehyde ammonia in the presence of an alcoholic solvent.

In accordance with the practice of this invention high yields of monoethylamine together with small amounts of diethylamine are produced by hydrogenation of aldehyde ammonia in a solvent which is composed mainly of monoethylamine or diethylamine or mixtures thereof.

One advantage of the process of this invention, as compared to the conventional process of hydrogenation of aldehyde ammonia in an alcoholic solvent is that in the process of this invention the reaction product contains only the water liberated by the decomposition of aldehyde ammonia, monoethylamine, diethylamine and possibly small amounts of high boiling by-products. As a result, the rectification for recovery of the purified amine from the reaction product is easier.

Aldehyde ammonia is produced by the reaction of ammonia with acetaldehyde, at room temperature, i.e. 20–25° C. The reaction is ordinarily carried out in a solvent, for example, alcohol such as ethanol, which may be anhydrous or which may contain water, as in a water-alcohol mixture having an alcohol content as low as 40% by volume. For example, ammonia may be dissolved, in amounts up to saturation, in the alcoholic or hydroalcoholic solvent and then acetaldehyde is reacted in the solution that is obtained. The aldehyde ammonia can be recovered from the reaction mixture by crystallization.

Aldehyde ammonia has been given the structure of a trimeric imine hydrate, $(CH_3—CH=NH)_3 \cdot 3H_2O$, which may be represented by the following cyclic form:

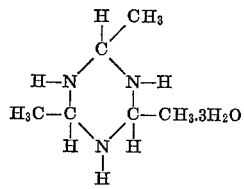

This substance is readily converted to the imine, $CH_3—CH=NH$, by dehydration under the action of heat. By hydrogenation in monoethylamine and/or diethylamine as a solvent, in accordance with the practice of this invention, aldehyde ammonia is converted almost entirely to monoethylamine.

The hydrogenation reaction is carried out preferably in the presence of a catalyst at a temperature within the range of 60–100° C. and more preferably at a temperature within the range of 75–85° C. The operating pressure may be atmospheric or above atmospheric. The preferred pressure range is 15–50 kg./cm.², effective. The preferred catalyst is a nickel-base hydrogenation catalyst and more preferably reduced nickel deposited on a suitable carrier.

Theoretically, the aldehyde ammonia to be subjected to hydrogenation can be employed in solution at various concentrations up to the saturation point. In actual practice and for increased productivity, it is preferred to make use of a concentration in the neighborhood of saturation. When monoethylamine is employed as the solvent, the concentration of aldehyde ammonia is preferably maintained within the range of 20–25% by weight and in diethylamine, it is employed in a concentration within the range of 2–3% by weight with the saturation point being about 3% by weight and the preferred concentration range for solution in a mixture of the two amines will be intermediate between the above ranges, depending upon the composition of the mixture. Thus, in a mixture of substantially equal parts by weight of monoethylamine and diethylamine, the preferred concentration of aldehyde ammonia is within the range of 8–11% by weight.

As a solvent, it is possible to make use of monoethylamine and/or diethylamine containing a small amount of water. The hydrogenation reaction is not detrimentally influenced by the presence of such small amount of water but it is desirable carefully to limit the amount of water in the amine solvent because the solubility of the aldehyde ammonia in the reaction medium is materially decreased thereby. As a result, if the solvent of the present invention is formulated to contain 10% by weight of water, the solubility of the aldehyde ammonia is reduced by half. In actual practice, it is recommended to limit the amount of water to not more than 5% by weight in the amine solvent.

In the process of the present invention, the total yield of monoethylamine and diethylamine is usually close to 100%.

The aldehyde ammonia, used as a starting material, may be prepared in various ways. More particularly, it may be prepared in ethanol, with or without water, for example containing from 100% to 40% by volume of ethanol, by dissolving ammonia in the ethanol, such as at a temperature of 20° C. and under atmospheric pressure. The dissolution is accompanied with considerable evolution of heat thereby to necessitate the removal of heat as by controlling the dissolution vessel, as by surrounding it by a mixture of ice and water to maintain the temperature at about 20° C. If absolute ethanol is used, it is saturated with ammonia which, at 20° C., gives an alcoholic solution containing 6.6 to 6.7 moles of $NH_3$ per kg. In highly aqueous ethanol, larger amounts of ammonia are readily dissolved because of the presence of water and, without going up to the saturation point, there is easily obtained solutions containing 12 to 15 moles of $NH_3$ per kg.

From such ammonia solutions, aldehyde ammonia is prepared by reaction with acetaldehyde. Experiments show that the operation may be carried out in various ways. The following two methods have been successfully employed.

In accordance with the first method, there is introduced gradually and simultaneously into a glass vessel, the ammonia solution and acetaldehyde in such amounts that there is eventually a slight excess of ammonia of the order of 0.5 mole per kg. Introduction is made with stirring and with cooling to maintain the temperature at about 20° C.

In accordance with the second method, the ammonia solution is placed in the vessel maintained at 20° C. The acetaldehyde is gradually introduced with stirring and with maintenance of the temperature at 20° C. by cooling, with the same slight excess of ammonia as described above.

By either of these methods, there is obtained an alcoholic or hydroalcoholic solution of aldehyde ammonia. The aldehyde ammonia is recovered in crystallized form by conventional technique.

The following examples illustrate the hydrogenation of aldehyde ammonia in accordance with the process of this invention:

EXAMPLE 1

In an autoclave having a capacity of 3 liters, there is introduced 1400 ml. of a 20% by weight solution of aldehyde ammonia in monoethylamine and 200 ml. of a reduced nickel catalyst on a silica carrier ("Aerosil"). The liquid is then saturated with ammonia under pressure so as to provide an excess of about 50% ammonia in the liquid. The solution is hydrogenated at a temperature within the range of 75–80° C. under a hydrogen pressure of 25 kg./cm.$^2$, effective. The reaction time is between 45 and 60 minutes.

After cooling to about 40° C., the contents of the autoclave are degassed with the evolved gases being bubbled through water for recovery of entrained monoethylamine and ammonia. A colorless liquid remains in the autoclave which is easily separated from the catalyst by decantation. The amines therein are determined by chromatography.

The yields are: monoethylamine 90%, diethylamine 9%. Only 1% of high boiling by-products was formed.

EXAMPLE 2

The operation of Example 1 is repeated except that, as the starting material, use is made of a 10% by weight solution of aldehyde ammonia in a mixture of equal parts by weight of monoethylamine and diethylamine. The liquid is saturated with ammonia under pressure so as to give an excess of ammonia of about 100% and the solution is hydrogenated at a temperature within the range of 80–85° C. under a hydrogen pressure of 30 kg./cm.$^2$, effective.

The yields are: monoethylamine 92%, diethylamine 8%.

It will be apparent from the foregoing that we have provided an improved process for the preparation of monoethylamine in high yields and in a high state of purity and wherein the separation of the amine products can be effected in a simple and efficient manner.

It will be understood that changes may be made in the details of formulation and operation without departing from the spirit of the invention, especially as defined in the following claims.

We claim:
1. A process for producing monoethylamine comprising hydrogenating aldehyde ammonia in the presence of a nickel catalyst at a temperature within the range of 60–100° C. under positive pressure, with the aldehyde ammonia present in solution in an amount up to saturation in a solvent medium selected from the group consisting of monoethylamine and diethylamine and mixtures thereof containing not more than 10% by weight water.
2. A process as claimed in claim 1 in which the catalyst is a reduced nickel catalyst deposited on a silica carrier.
3. A process as claimed in claim 1 in which the hydrogenation is carried out at a temperature within the range of 75–85° C.
4. A process as claimed in claim 1 in which the pressure is within the range of 15–50 kg./cm.$^2$, effective.
5. A process as claimed in claim 1 in which the hydrogenation is carried out in the presence of ammonia.
6. A process as claimed in claim 1 in which the amine solvent contains not more than 5% by weight of water.
7. A process as claimed in claim 1 in which the solvent is monoethylamine and in which the aldehyde ammonia is present in the solvent in a concentration within the range of 20–25% by weight.
8. A process as claimed in claim 1 in which the solvent is diethylamine and in which the aldehyde ammonia is present in the solvent in a concentration within the range of 2–3% by weight.
9. A process as claimed in claim 1 in which the solvent is a mixture of substantially equal parts by weight of monoethylamine and diethylamine and in which the aldehyde ammonia is present in a concentration within the range of 8–11% by weight.

References Cited

UNITED STATES PATENTS

| | | | |
|---|---|---|---|
| 2,278,372 | 3/1942 | Olin et al. | 260—583 |
| 2,809,995 | 10/1957 | Noeske et al. | 260—583X |

CHARLES B. PARKER, Primary Examiner

R. L. RAYMOND, Assistant Examiner